(12) United States Patent
Beuville et al.

(10) Patent No.: US 12,513,431 B2
(45) Date of Patent: Dec. 30, 2025

(54) DIGITAL PIXEL ARCHITECTURE SUPPORTING RE-USE OF COMPONENTS FOR IN-PIXEL ANALOG-TO-DIGITAL CONVERSION OF INTEGRATION RESIDUE

(71) Applicant: Raytheon Company, Tewksbury, MA (US)

(72) Inventors: Eric J. Beuville, Goleta, CA (US); Joshua J. Cantrell, Goleta, CA (US); Micky R. Harris, Lompoc, CA (US)

(73) Assignee: Raytheon Company, Arlington, VA (US)

( * ) Notice: Subject to any disclaimer, the term of this patent is extended or adjusted under 35 U.S.C. 154(b) by 225 days.

(21) Appl. No.: 18/520,258

(22) Filed: Nov. 27, 2023

(65) Prior Publication Data

US 2025/0175721 A1    May 29, 2025

(51) Int. Cl.
*H04N 25/772* (2023.01)
*H03K 5/24* (2006.01)
(Continued)

(52) U.S. Cl.
CPC ............. *H04N 25/772* (2023.01); *H03K 5/24* (2013.01); *H03K 21/02* (2013.01); *H03M 1/56* (2013.01)

(58) Field of Classification Search
CPC ........ H04N 25/772; H03K 5/24; H03K 21/02; H03M 1/56
(Continued)

(56) References Cited

U.S. PATENT DOCUMENTS

| 5,624,848 | A | 4/1997 | Marnie et al. |
| 6,121,843 | A | 9/2000 | Vampola et al. |

(Continued)

FOREIGN PATENT DOCUMENTS

| CN | 102523394 B | 4/2014 |
| CN | 107563202 B | 12/2020 |

(Continued)

OTHER PUBLICATIONS

Non-Final Office Action dated Jun. 18, 2024 in connection with U.S. Appl. No. 18/165,663, 9 pages.
(Continued)

*Primary Examiner* — Joel W Fosselman

(57) ABSTRACT

A system includes a focal plane array having multiple pixel circuit elements. Each pixel circuit element includes a photodetector configured to generate an electrical current based on received illumination. Each pixel circuit element also includes an integration capacitor configured to be charged by the electrical current and generate a capacitor voltage and to be discharged. Each pixel circuit element further includes a comparator configured to generate pulses in a digital output based on the capacitor voltage of the integration capacitor. In addition, each pixel circuit element includes a counter configured to (i) in a first configuration, count the pulses in the digital output of the comparator during a sampling period and (ii) in a second configuration, count pulses in a clock signal during a residue digitization period. A counted number of pulses in the clock signal is indicative of a residue stored on the integration capacitor at an end of the sampling period.

20 Claims, 4 Drawing Sheets

(51) Int. Cl.
*H03K 21/02* (2006.01)
*H03M 1/56* (2006.01)

(58) Field of Classification Search
USPC .......................................................... 348/308
See application file for complete search history.

(56) References Cited

U.S. PATENT DOCUMENTS

| | | | |
|---|---|---|---|
| 6,252,462 | B1 | 6/2001 | Hoffman |
| 6,885,002 | B1 | 4/2005 | Finch et al. |
| 6,927,796 | B2 | 8/2005 | Liu et al. |
| 7,148,727 | B2 | 12/2006 | Van Bogget |
| 7,326,903 | B2 | 2/2008 | Ackland |
| 7,333,129 | B2 | 2/2008 | Miller et al. |
| 7,812,755 | B2 | 10/2010 | Vampola et al. |
| 9,621,829 | B1 | 4/2017 | Boemler |
| 9,628,105 | B1 | 4/2017 | Veeder |
| 10,242,268 | B2 | 3/2019 | Harris et al. |
| 10,447,293 | B1 | 10/2019 | Hairston |
| 10,530,380 | B2 | 1/2020 | Beuville et al. |
| 11,258,977 | B2 | 2/2022 | Lule |
| 11,496,701 | B2 | 11/2022 | Cantrell |
| 11,843,355 | B2 | 12/2023 | Kean et al. |
| 12,029,599 | B2 | 7/2024 | Cao et al. |
| 2003/0150979 | A1 | 8/2003 | Lauffenburger et al. |
| 2004/0008136 | A1 | 1/2004 | Reyneri et al. |
| 2005/0168602 | A1 | 8/2005 | Sumi et al. |
| 2005/0199813 | A1 | 9/2005 | Van Bogget |
| 2008/0106297 | A1 | 5/2008 | Jao |
| 2008/0218614 | A1 | 9/2008 | Joshi et al. |
| 2011/0221520 | A1 | 9/2011 | Bales |
| 2012/0261553 | A1 | 10/2012 | Elkind et al. |
| 2012/0305786 | A1 | 12/2012 | Dierickx |
| 2013/0187028 | A1 | 7/2013 | Salvestrini et al. |
| 2014/0061472 | A1 | 3/2014 | Salvestrini et al. |
| 2017/0205283 | A1 | 7/2017 | Wyles et al. |
| 2018/0124336 | A1 | 5/2018 | Jonas |
| 2019/0313046 | A1 | 10/2019 | McGee, III et al. |
| 2019/0334541 | A1 | 10/2019 | Beuville et al. |
| 2019/0335118 | A1 | 10/2019 | Simolon et al. |
| 2021/0029286 | A1* | 1/2021 | Liu .................. H04N 23/73 |
| 2022/0311960 | A1 | 9/2022 | Cantrell |
| 2023/0095511 | A1 | 3/2023 | Boemler |
| 2023/0253932 | A1 | 8/2023 | Kean et al. |
| 2023/0269502 | A1 | 8/2023 | Black et al. |

FOREIGN PATENT DOCUMENTS

| | | |
|---|---|---|
| CN | 115876320 A | 3/2023 |
| CN | 115914872 B | 3/2024 |
| TW | I287818 B | 10/2007 |

OTHER PUBLICATIONS

1 Final Office Action dated Jul. 19, 2024 in connection with U.S. Appl. No. 18/165,713, 8 pages.
Notice of Allowance dated Jan. 13, 2025 in connection with U.S. Appl. No. 18/165,663, 9 pages.
Salem et al., "A Review of: Digital-Pixel Focal Plane Array Technology," Oct. 2016, 7 pages.
Abbasi et al., "A PFM based Digital Pixel with Off-Pixel Residue Measurement for 15μm Pitch MWIR FPAs," Proc. of SPIE, vol. 9819, Infrared Technology and Applications XLII, May 2016, 7 pages.
Trepanier et al., "A Wide Dynamic Range CMOS Digital Pixel Sensor," 45th Midwest Symposium on Circuits and Systems, 2002, 4 pages.
Abbasi et al., "A PFM-Based Digital Pixel with Off-Pixel Residue Measurement for Small Pitch FPAs," IEEE Transactions on Circuits and Systems-II: Express Briefs, vol. 64, No. 8, Aug. 2017, 5 pages.
Ogi et al., "Analog and 15-b digital Output Image Sensor for Wide Dynamic Range," 2005 IEEE Workshop on Charge-Coupled Devices and Advanced Image Sensors, Jun. 2005, 4 pages.
Brown et al., "Digital-pixel focal plane array development," Proc. of SPIE, vol. 7608, Quantum Sensing and Nanophotonic Devices, Jan. 2010, 11 pages.
Kean et al., "High-Energy Suppression for Capacitor Transimpedance Amplifier (CTIA)-Based Imagers or Other Imaging Devices," U.S. Appl. No. 17/649,994, filed Feb. 4, 2022, 30 pages.
Kean, "Artifact Mitigation in Capacitor Transimpedance Amplifier (CTIA)-Based Imagers or Other Imaging Devices," U.S. Appl. No. 18/165,663, filed Feb. 7, 2023, 36 pages.
Kean, "High Flux Detection and Imaging Using Capacitor Transimpedance Amplifier (CTIA)-Based Unit Cells in Imaging Devices," U.S. Appl. No. 18/165,713, filed Feb. 7, 2023, 49 pages.
Bisiaux et al., "A 14-b Two-step Inverter-based ρΔ ADC for CMOS Image Sensor," 15th IEEE International New Circuits and Systems Conference, Nov. 2017, 4 pages.
Non-Final Office Action dated Apr. 19, 2023 in connection with U.S. Appl. No. 17/480,554, 11 pages.
Notice of Allowance dated Mar. 15, 2023 in connection with U.S. Appl. No. 17/649,994, 9 pages.
Notice of Allowance dated Oct. 3, 2023 in connection with U.S. Appl. No. 17/480,554, 13 pages.
Non-Final Office Action dated Jan. 3, 2024 in connection with U.S. Appl. No. 18/165,713, 6 pages.
Notice of Allowance dated Jun. 28, 2023 in connection with U.S. Appl. No. 17/649,994, 8 pages.
Non-Final Office Action dated Mar. 3, 2025 in connection with U.S. Appl. No. 18/302,641, 12 pages.
Non-Final Office Action dated Apr. 9, 2024, in connection with U.S. Appl. No. 18/165,713, 7 pages.

* cited by examiner

DIGITAL PIXEL ARCHITECTURE SUPPORTING RE-USE OF COMPONENTS FOR IN-PIXEL ANALOG-TO-DIGITAL CONVERSION OF INTEGRATION RESIDUE

GOVERNMENT RIGHTS

This invention was made with government support under contract number HR0011-17-C-0064 awarded by DARPA. The government has certain rights in the invention.

TECHNICAL FIELD

This disclosure relates generally to imaging systems. More specifically, this disclosure relates to a digital pixel architecture supporting the re-use of components for in-pixel analog-to-digital conversion of an integration residue.

BACKGROUND

Digital imaging systems often use integration capacitors and comparators to capture information when generating digital images. For example, an electrical current from a photodetector can be used to charge an integration capacitor, and a comparator can be used to compare the electrical charge stored on the integration capacitor to a reference voltage. Once the electrical charge stored on the integration capacitor meets or exceeds the reference voltage, the integration capacitor can be reset (discharged), and the process can be repeated. The number of times that the integration capacitor is charged to the reference voltage during an image capture operation can be counted and used to generate image data for that pixel. This process can be performed for each pixel in an imaging array in order to generate image data for the array.

SUMMARY

This disclosure relates to a digital pixel architecture supporting the re-use of components for in-pixel analog-to-digital conversion of an integration residue.

In a first embodiment, an apparatus includes a photodetector configured to generate an electrical current based on received illumination. The apparatus also includes an integration capacitor configured to be charged by the electrical current and generate a capacitor voltage and to be discharged. The apparatus further includes a comparator configured to generate pulses in a digital output based on the capacitor voltage of the integration capacitor. In addition, the apparatus includes a counter configured to (i) in a first configuration, count the pulses in the digital output of the comparator during a sampling period and (ii) in a second configuration, count pulses in a clock signal during a residue digitization period. A counted number of pulses in the clock signal is indicative of a residue stored on the integration capacitor at an end of the sampling period.

In a second embodiment, a system includes a focal plane array having multiple pixel circuit elements. Each pixel circuit element includes a photodetector configured to generate an electrical current based on received illumination. Each pixel circuit element also includes an integration capacitor configured to be charged by the electrical current and generate a capacitor voltage and to be discharged. Each pixel circuit element further includes a comparator configured to generate pulses in a digital output based on the capacitor voltage of the integration capacitor. In addition, each pixel circuit element includes a counter configured to (i) in a first configuration, count the pulses in the digital output of the comparator during a sampling period and (ii) in a second configuration, count pulses in a clock signal during a residue digitization period. A counted number of pulses in the clock signal is indicative of a residue stored on the integration capacitor at an end of the sampling period.

In a third embodiment, a method includes generating an electrical current based on received illumination. The method also includes charging an integration capacitor using the electrical current to generate a capacitor voltage and discharging the integration capacitor. The method further includes generating pulses in a digital output of a comparator based on the capacitor voltage of the integration capacitor. The method also includes using a counter in a first configuration to count the pulses in the digital output of the comparator during a sampling period. In addition, the method includes using the counter in a second configuration to count pulses in a clock signal during a residue digitization period. A counted number of pulses in the clock signal is indicative of a residue stored on the integration capacitor at an end of the sampling period.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

Figure 1:
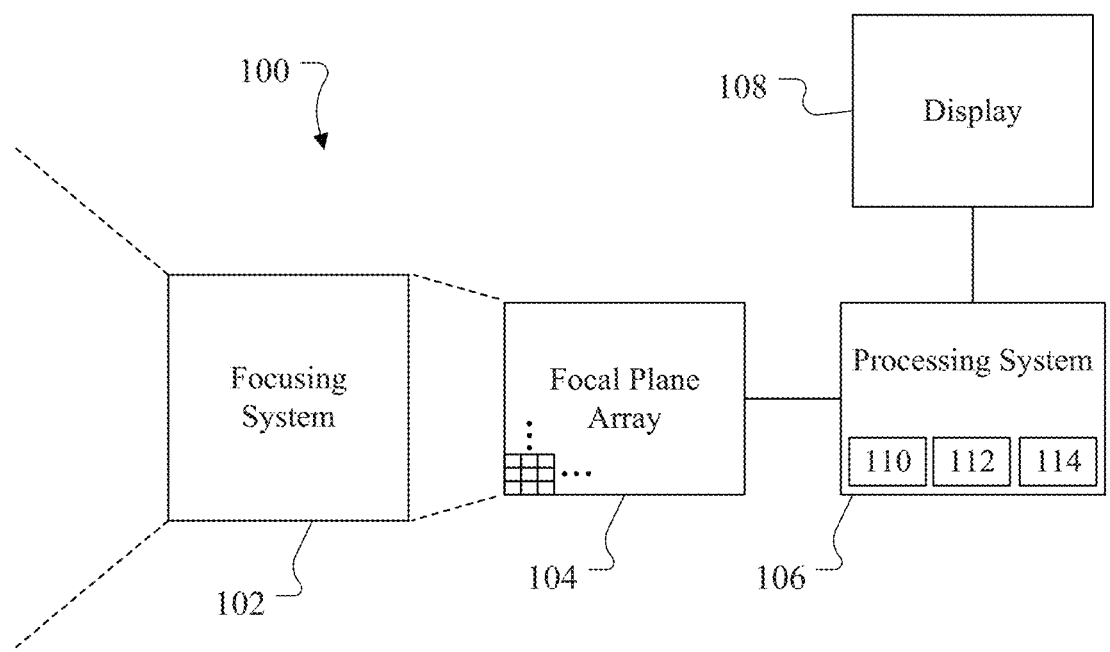
FIG. 1 illustrates an example system using a digital pixel architecture supporting the re-use of components for in-pixel analog-to-digital conversion of an integration residue according to this disclosure.

FIGS. 1 through 4, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, digital imaging systems often use integration capacitors and comparators to capture information when generating digital images. For example, an electrical current from a photodetector can be used to charge an integration capacitor, and a comparator can be used to compare the electrical charge stored on the integration capacitor to a reference voltage. Once the electrical charge stored on the integration capacitor meets or exceeds the reference voltage, the integration capacitor can be reset (discharged), and the process can be repeated. The number of times that the integration capacitor is charged to the reference voltage during an image capture operation can be counted and used to generate image data for that pixel. This process can be performed for each pixel in an imaging array in order to generate image data for the array.

Some pixel architectures support the measurement and use of an integration residue, which refers to the electrical charge stored on an integration capacitor at the end of an integration time period (also called a sampling period). That is, the integration capacitor for each pixel often does not reach the reference voltage exactly at the end of an integration time period, so the integration capacitor may store a residual electrical charge at the end of the integration time period. By measuring the electrical charge stored on the integration capacitor at the end of an integration time period, it is possible to achieve greater accuracy in the generation of image data.

To measure the residual electrical charges stored on the integration capacitors of multiple pixels, the pixels typically include switches that can couple the pixels to column analog-to-digital converters. Each column analog-to-digital converter can be selectively coupled to different pixels in a column of pixels, and the collection of column analog-to-digital converters are often selectively coupled to each row of pixels during an image generation process. This allows the column analog-to-digital converters to collectively digitize the residual electrical charges stored on the integration capacitors of each row of pixels sequentially. While this approach is effective, it can be relatively slow to couple the column analog-to-digital converters to each row of pixels in order to digitize the residual electrical charges stored on the integration capacitors of each row of pixels. As a result, this can limit the frame rate of image capture, meaning this can limit the number of images that can be generated within a given time period.

This disclosure provides a digital pixel architecture supporting the re-use of components for in-pixel analog-to-digital conversion of an integration residue. As described in more detail below, the digital pixel architecture includes an integration capacitor that is charged based on electrical current from a photodetector. A comparator compares the voltage of the integration capacitor with a reference voltage, and the comparator generates a digital output based on the comparison. When the capacitor voltage equals or exceeds the reference voltage, the comparator toggles its output, and the integration capacitor is reset to a reset voltage (causing the comparator to toggle its output again). The integration capacitor can be charged again and can be reset each time the capacitor voltage equals or exceeds the reference voltage. As a result, the digital output generated by the comparator contains pulses, and the number of pulses varies based on the amount of illumination received by the photodetector. The digital pixel architecture uses a counter to count the number of pulses contained in the digital output generated by the comparator. At the end of an integration time period, the counter can provide a first count value.

The digital pixel architecture can also be reconfigured after the integration time period so that the comparator and counter are used to digitize any residual electrical charge or residue remaining on the integration capacitor. For example, instead of coupling the integration capacitor to receive the reset voltage, the integration capacitor can be coupled to receive a ramp voltage. Moreover, a clock signal can be provided to the counter. The ramp voltage can be used to increase the capacitor voltage of the integration capacitor, and the counter can be used to count the number of pulses in the clock signal. Eventually, the capacitor voltage on the integration capacitor meets or exceeds the reference voltage, causing the comparator to toggle its output. This causes the counter to stop counting pulses in the clock signal, such as by latching the output of the counter and/or by disconnecting the clock signal from the counter. As a result, the total number of clock pulses counted by the counter will be inversely proportional to the size of the residual electrical charge remaining on the integration capacitor at the end of the integration time period. If the residual electrical charge is higher, the counter will count fewer clock pulses since it takes less time for the ramp voltage to charge the integration capacitor to the reference voltage level. If the residual electrical charge is lower, the counter will count more clock pulses since it takes more time for the ramp voltage to charge the integration capacitor to the reference voltage level. At the end of this additional time period, the counter can provide a second count value. The second count value can be processed in order to obtain an estimate of the residue remaining on the integration capacitor or to otherwise use the second count value.

In this way, components of the digital pixel architecture are re-used in order to create a single-slope analog-to-digital converter (SSADC) within the digital pixel architecture that converts an analog voltage residue stored on an integration capacitor into a digital value. This can be done at the pixel level, meaning each individual pixel may be configured to convert its residue voltage into a digital value. Among other things, this can reduce or eliminate the need for using column analog-to-digital converters and can help to speed up the overall process of generating image data. Among other reasons, this is because the described approaches may allow all pixels to convert their residues into digital values in parallel (rather than sequentially row by row), although the conversions of the residues into digital values may occur in other ways (such as by row, by multiple rows, or by other subsets). Depending on the implementation, the frame rate that is achievable using the digital pixel architecture can increase, allowing more images to be captured within a given time period.

Imaging systems designed in accordance with this disclosure may be used in any suitable applications. For example, imaging systems designed in accordance with this disclosure may be used in digital cameras, video recorders, smartphones, or other electronic devices that can be used to capture still or video images. Imaging systems designed in accordance with this disclosure may be used in commercial and defense-related satellites, aircraft, and drones, such as to produce visible, infrared, or other images of scenes. Imaging systems designed in accordance with this disclosure may be used in telescopes, satellites, or other astronomy-related settings, such as to generate images of planets, stars, galaxies, or other celestial bodies. Imaging systems designed in accordance with this disclosure may be used in robotic systems or other systems intended for use in surgical or industrial settings, such as to generate images of patients undergoing treatment or images of components being fabricated or processed using lasers or other electromagnetic energy. Imaging systems designed in accordance with this disclosure may be used in medical imaging systems, such as to produce images of patients in the presence of x-rays or other electromagnetic energy. In general, the imaging systems designed in accordance with this disclosure may be used in any suitable applications.

FIG. 1 illustrates an example system 100 using a digital pixel architecture supporting the re-use of components for in-pixel analog-to-digital conversion of an integration residue according to this disclosure. As shown in FIG. 1, the system 100 includes a focusing system 102, a focal plane array 104, and a processing system 106. The focusing system 102 generally operates to focus illumination from a scene onto the focal plane array 104. The focusing system 102 may have any suitable field of view that is directed onto the focal plane array 104. The focusing system 102 includes any suitable structure(s) configured to focus illumination, such as one or more lenses, mirrors, or other optical devices.

The focal plane array 104 generally operates to capture image data related to a scene. For example, the focal plane array 104 may include a matrix or other collection of pixel circuit elements that generate and process electrical signals representing a scene. Several of the pixel circuit elements are shown in FIG. 1, although the size of the pixel circuit elements is exaggerated for convenience here. The focal plane array 104 may capture image data in any suitable spectrum or spectra, such as in the visible, infrared, or ultraviolet spectrum. The focal plane array 104 may also have any suitable resolution, such as when the focal plane array 104 includes a collection of approximately 1,000 pixel circuit elements by approximately 1,000 pixel circuit elements (although other collection sizes may be used). The focal plane array 104 includes any suitable collection of pixel circuit elements configured to capture image data. The focal plane array 104 may also include additional components that facilitate the receipt and output of information, such as readout integrated circuits (ROICs).

As described in more detail below, the pixel circuit elements of the focal plane array 104 include photodiodes or other photodetectors that capture illumination from a scene and generate electrical currents. For each pixel circuit element, the electrical current can be used to charge an integration capacitor, and the voltage of the integration capacitor can be compared to a reference voltage by a comparator. The comparator can generate pulses in a digital output when the capacitor voltage meets or exceeds the reference voltage. A counter can be used to count the number of pulses in the digital output from the comparator, and the count value at the end of each integration time period may be output. In addition, after each integration time period, each pixel circuit element may be reconfigured to re-use its comparator and counter to digitize and output the residue stored on the integration capacitor at the end of that integration time period.

The processing system 106 receives outputs from the focal plane array 104 and processes the information. For example, the processing system 106 may process image data generated by the focal plane array 104 in order to generate visual images for presentation to one or more personnel, such as on a display 108. However, the processing system 106 may use the image data generated by the focal plane array 104 in any other suitable manner. The processing system 106 includes any suitable structure configured to process information from a focal plane array or other imaging system. For instance, the processing system 106 may include one or more processing devices 110, such as one or more microprocessors, microcontrollers, digital signal processors, field programmable gate arrays, application specific integrated circuits, or discrete logic devices. The processing system 106 may also include one or more memories 112, such as a random access memory, read only memory, hard drive, Flash memory, optical disc, or other suitable volatile or non-volatile storage device(s). The processing system 106 may further include one or more interfaces 114 that support communications with other systems or devices, such as a network interface card or a wireless transceiver facilitating communications over a wired or wireless network or a direct connection. The display 108 includes any suitable device configured to graphically present information.

Although FIG. 1 illustrates one example of a system 100 using a digital pixel architecture supporting the re-use of components for in-pixel analog-to-digital conversion of an integration residue, various changes may be made to FIG. 1. For example, various components in FIG. 1 may be combined, further subdivided, replicated, omitted, or rearranged and additional components may be added according to particular needs. Also, FIG. 1 illustrates one example type of system in which a digital pixel architecture supporting the re-use of components for in-pixel analog-to-digital conversion of an integration residue may be used. However, the digital pixel architecture may be used in any other suitable device or system.

Figure 2:
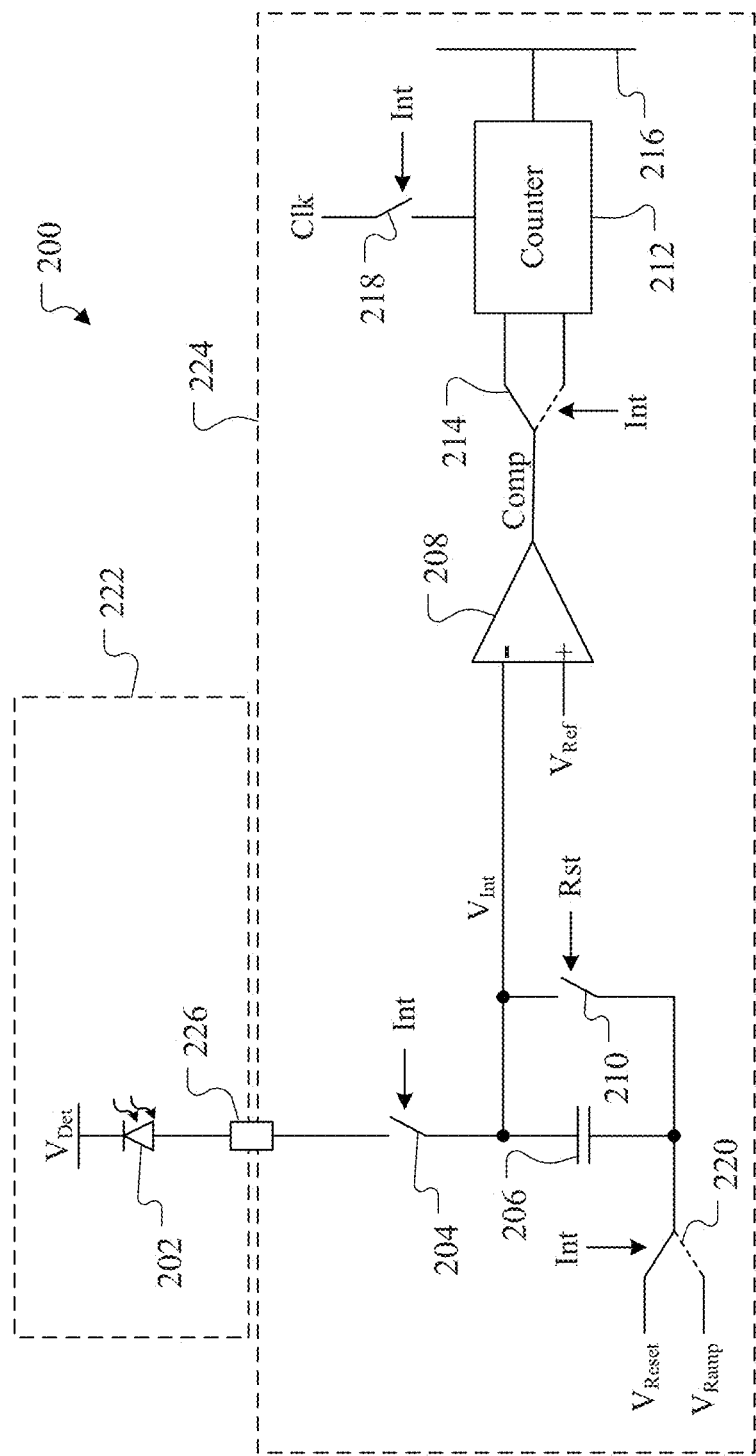
FIG. 2 illustrates an example circuit providing a digital pixel architecture supporting the re-use of components for in-pixel analog-to-digital conversion of an integration residue according to this disclosure.

FIG. 2 illustrates an example circuit 200 providing a digital pixel architecture supporting the re-use of components for in-pixel analog-to-digital conversion of an integration residue according to this disclosure. An instance of the circuit 200 shown in FIG. 2 may, for example, represent (or be used as at least part of) each pixel circuit element of the focal plane array 104 in the system 100 shown in FIG. 1. Thus, different pixel circuit elements of the focal plane array 104 may include different instances of the circuit 200 shown in FIG. 2. However, any number of the circuits 200 may be used with any other suitable device and in any other suitable system.

As shown in FIG. 2, the circuit 200 includes a photodetector 202, which generally operates to produce an electrical current based on received illumination. The photodetector 202 includes any suitable structure configured to generate an electrical current based on received illumination, such as a photodiode. In some cases, the photodetector 202 may represent a photodiode or other structure that can sense illumination in a specified wavelength range or band, such as in the visible, infrared, or ultraviolet spectrum. The photodetector 202 here is coupled to receive a detector voltage $V_{Det}$, which may be provided by any suitable voltage source.

Generation of the electrical current by the photodetector 202 is controlled using a switch 204, which in some cases may be implemented using a transistor. The switch 204 in this example is controlled using an integration control signal Int, which can be used to define an integration time period. The integration time period refers to a time period during which the circuit 200 integrates the electrical current from the photodetector 202. The integration control signal Int can be provided by any suitable source, such as a controller. When permitted by the switch 204, the electrical current generated by the photodetector 202 is provided to an integration capacitor 206, which can store an electrical charge that varies based on the electrical current received by the integration capacitor 206 from the photodetector 202.

The voltage of the integration capacitor 206 is provided to a comparator 208, which also receives a reference voltage $V_{Ref}$ (which may be provided by any suitable voltage source). The comparator 208 compares the voltage of the integration capacitor 206 and the reference voltage $V_{Ref}$ and generates a digital output Comp based on the comparison. For example, when the capacitor voltage meets or exceeds the reference voltage $V_{Ref}$, the comparator 208 can toggle its output, such as by toggling from a low logic signal to a high logic signal. The integration capacitor 206 is coupled in parallel with a switch 210, which in some cases may be implemented using a transistor. The switch 210 is controlled using a reset signal Rst, which in some cases may represent or be based on the output of the comparator 208. Closing the switch 210 short-circuits or bypasses the integration capacitor 206, which allows the integration capacitor 206 to be discharged until the electrical charge stored on the integration capacitor 206 is equivalent to a reset voltage $V_{Reset}$. The reset voltage $V_{Reset}$ may be provided by any suitable voltage source or may represent a ground voltage.

During operation in this configuration, the integration capacitor 206 may initially have a voltage equivalent to the reset voltage $V_{Reset}$ at the beginning of a sampling period. The switch 204 may be closed at the beginning of the sampling period, and the photodetector 202 can provide electrical current to the integration capacitor 206 during the sampling period. This charges the integration capacitor 206, and the charging can continue until the voltage on the integration capacitor 206 meets or exceeds the reference voltage $V_{Ref}$. When this occurs, the comparator 208 toggles its output, which causes the switch 210 to close and discharges the integration capacitor 206. The discharging causes the stored voltage on the integration capacitor 206 to drop below the reference voltage $V_{Ref}$, which causes the comparator 208 to toggle its output again (creating a pulse in the comparator's digital output Comp). This causes the switch 210 to open, and the integration capacitor 206 can again be charged using the electrical current from the photodetector 202. This can occur any number of times during the sampling period, which causes the comparator 208 to generate a series of relatively-narrow pulses at a pulse rate that is proportional to the amount of photocurrent generated by the photodetector 202.

A counter 212 is configured to count pulses in the digital output Comp generated by the comparator 208, which allows the counter 212 to accumulate the pulses contained in the digital output Comp from the comparator 208 and store/output the accumulated value. In some embodiments, during this time, the output of the comparator 208 can be coupled to a "count" input of the counter 212 by a switch 214, which in some cases may be implemented using a transistor. The switch 214 may be controlled by the integration control signal Int. In this configuration, the counter 212 can count the number of pulses in the digital output Comp generated by the comparator 208, and the counter 212 can latch the count value at the end of the sampling period. The latched value can be output, such as over a column line 216. The column line 216 represents an electrical conductor that can be coupled to one or more pixel circuit elements. For example, multiplexing or other circuitry can be used to enable outputs from multiple pixel circuit elements to be obtained over the same column line 216. The focal plane array 104 may include any suitable number of column lines 216, each of which may be coupled to any suitable number of pixel circuit elements. Note, however, that the use of column lines 216 is optional, and outputs of the pixel circuit elements may be obtained in any other suitable manner. The counter 212 represents any suitable structure configured to count pulses.

The circuit 200 includes additional elements that allow certain components of the circuit 200 (namely the comparator 208 and the counter 212) to be re-used in order to digitize the residue stored on the integration capacitor 206 at the end of each sampling period. For example, the switch 214 can be used to switch the output of the comparator 208 from the "count" input of the counter 212 to a "latch" input of the counter 212. Also, a switch 218 can be used to selectively provide a clock signal Clk to the "count" input of the counter 212. In addition, a switch 220 can be used to couple a ramp voltage $V_{Ramp}$ (rather than the reset voltage $V_{Reset}$) to the integration capacitor 206. The ramp voltage $V_{Ramp}$ may be provided by any suitable voltage source. The switches 218 and 220 may be controlled by the integration control signal Int and in some cases may be implemented using transistors.

At the end of each sampling period, the capacitor voltage of the integration capacitor 206 can be less than the reference voltage $V_{Ref}$. Providing the ramp voltage $V_{Ramp}$ to the integration capacitor 206 can allow the integration capacitor 206 to be charged so that the capacitor voltage eventually meets or exceeds the reference voltage $V_{Ref}$. Until the capacitor voltage meets or exceeds the reference voltage $V_{Ref}$, the counter 212 is used to count the number of pulses in the clock signal Clk. The clock signal Clk may have any suitable frequency that can be counted by the counter 212, such as a 100 MHz frequency. While the capacitor voltage of the integration capacitor 206 does not meet or exceed the reference voltage $V_{Ref}$, the counter 212 counts the number of pulses in the clock signal Clk since the counter 212 is not latched. When the capacitor voltage of the integration capacitor 206 meets or exceeds the reference voltage $V_{Ref}$, the comparator 208 toggles its output, which latches the counter 212. At this point, the count value output from the counter 212 can be read over the column line 216 or in any other suitable manner. Effectively, the integration capacitor 206, comparator 208, and counter 212 function as a single-slope analog-to-digital converter that digitizes the residue stored on the integration capacitor 206 at the end of each sampling period.

Figure 3:
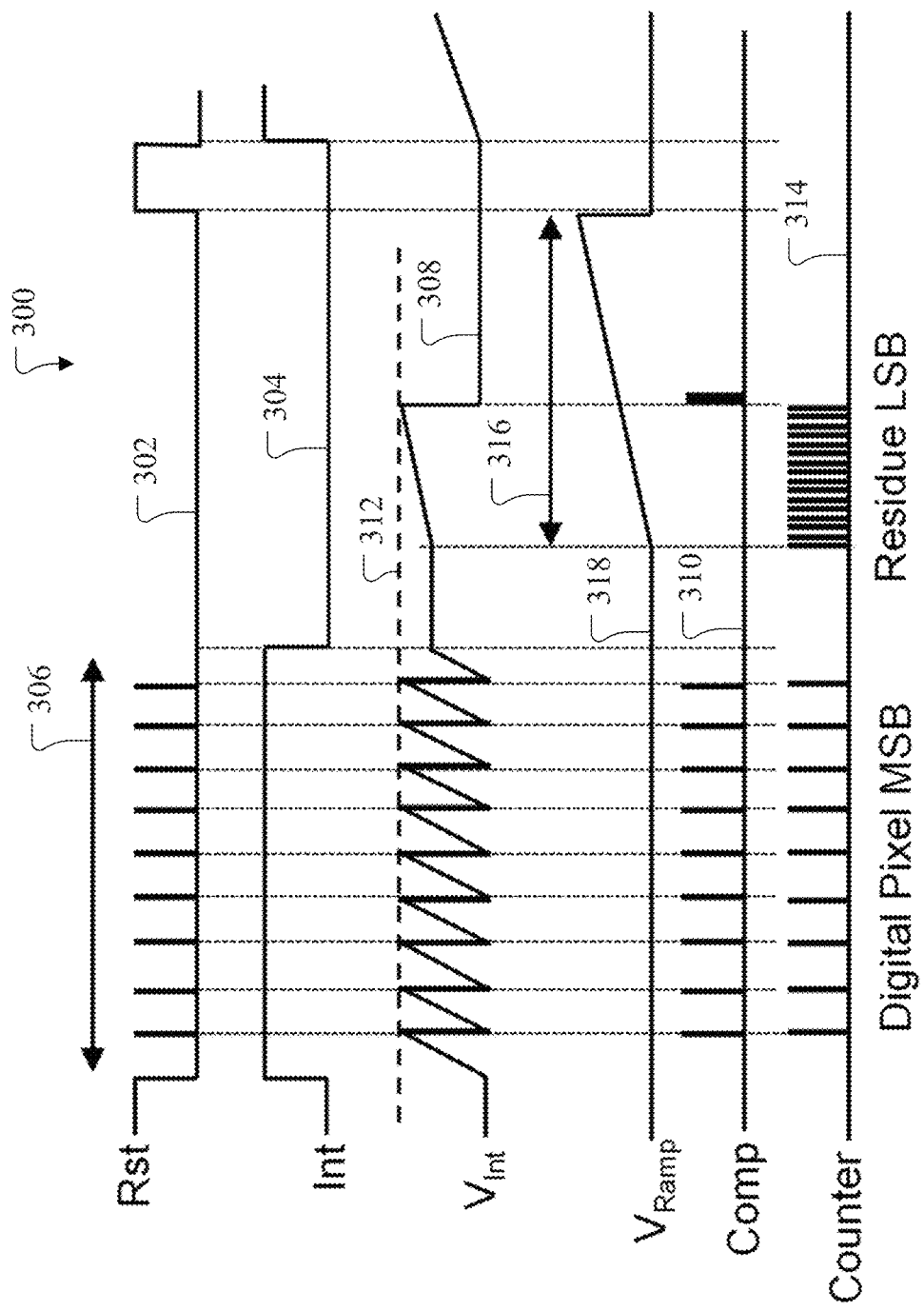
FIG. 3 illustrates an example timing diagram associated with operation of the digital pixel architecture shown in FIG. 2 according to this disclosure.

FIG. 3 illustrates an example timing diagram 300 associated with operation of the digital pixel architecture shown in FIG. 2 according to this disclosure. As shown in FIG. 3, a line 302 represents the reset signal Rst, and a line 304 represents the integration control signal Int. A pulse in the integration control signal Int defines the duration of an integration time period 306. A line 308 represents an integration voltage $V_{Int}$, which is the voltage of the integration capacitor 206. A line 310 represents the output of the comparator 208. During the integration time period 306, the integration capacitor 206 can be repeatedly charged based on the illumination received by the photodetector 202 and discharged, which creates a sawtooth pattern in the integration voltage $V_{Int}$. The integration capacitor 206 is reset to the reset voltage $V_{Reset}$ each time the integration voltage $V_{Int}$ rises to the reference voltage $V_{Ref}$, which is represented by a line 312. This creates pulses in the digital output Comp of the comparator 208. A line 314 represents the pulses that are counted by the counter 212, including the pulses in the digital output Comp of the comparator 208 that are counted during the integration time period 306.

As can be seen here, at the end of the integration time period 306, the integration voltage $V_{Int}$ is non-zero, which indicates that the integration capacitor 206 contains a residual electrical charge. During a subsequent residue digitization time period 316, the ramp voltage $V_{Ramp}$ is applied to the integration capacitor 206 (rather than the reset voltage $V_{Reset}$) via the switch 220, which charges the integration capacitor 206 and increases the integration voltage $V_{Int}$. While the integration voltage $V_{Int}$ remains below the reference voltage $V_{Ref}$, the counter 212 counts the pulses contained in the clock signal Clk, which is provided to the counter 212 via the switch 218 during the residue digitization time period 316. As shown here, the clock signal Clk can have a much higher frequency that the pulses created by charging and discharging the integration capacitor 206. Eventually, the integration voltage $V_{Int}$ meets or exceeds the reference voltage $V_{Ref}$, which causes the comparator 208 to create one last pulse in its digital output Comp. This pulse is provided to the "latch" input of the counter 212 via the switch 214, which causes the counter 212 to stop counting the pulses in the clock signal Clk. At the end of the residue digitization time period 316, the ramp voltage $V_{Ramp}$ stops being applied, and the reset signal Rst can be pulsed to reset the circuit 200. At that point, another integration time period 306 can be used to generate more image data.

In the example of FIG. 3, the integration time period 306 can be used to produce the most significant bits (MSBs) of a pixel's image data value, and the residue digitization time period 316 can be used to produce the least significant bits (LSBs) of the pixel's image data value. The number of bits representing the most significant bits and the number of bits representing the least significant bits can vary depending on the implementation. In some embodiments, the counter 212 may represent an eight to fourteen bit counter, and the number of most significant bits and the number of least significant bits can depend (at least partially) on the resolution of the counter 212. As long as the counter 212 can have adequate resolution to count pulses in the clock signal Clk (even for the entire duration of the residue digitization time period 316), the conversion of the residue to a digital value can be performed within the circuit 200 itself. Note that the value of the residue stored on the integration capacitor 206 can be inferred in any suitable manner using the count value generated by the counter 212 during the residue digitization time period 316. For instance, the count value may be divided by the frequency of the clock signal Clk, and the resulting value may be used to infer the residue stored on the integration capacitor 206.

Returning to FIG. 2, in some cases, various components of the circuit 200 may be implemented in separate devices. For example, a sensor chip or other sensor circuit 222 may include the photodetector 202 and may possibly include the photodetectors 202 for a large number of circuits 200. A separate readout integrated circuit (ROIC) chip or other ROIC circuit 224 can be used in conjunction with the sensor circuit 222. A conductive pad 226 can be used to electrically couple each photodetector 202 to the switch 204 in the associated instance of the circuit 200, such as when a conductive trace or a direct connection can be used to electrically couple the sensor circuit 222 and the ROIC circuit 224. Note, however, that this is for illustration only and that the circuit 200 may be implemented in any other suitable manner.

Multiple instances of the circuit 200 may be implemented in the focal plane array 104 or other structure in any suitable manner. For example, multiple instances of the circuit 200 may be implemented side-by-side. In some cases, three-dimensional stacking may be used to implement different portions of each circuit 200 at different levels or layers of an integrated circuit or other structure, which may allow the circuits 200 to be packed very close together. However, any suitable number of circuits 200 may be implemented in a focal plane array 104 or other structure in any other suitable manner.

Although FIG. 2 illustrates one example of a circuit 200 providing a digital pixel architecture supporting the re-use of components for in-pixel analog-to-digital conversion of an integration residue, various changes may be made to FIG. 2. For example, any of the circuit components shown in FIG. 2 may be replaced by different circuit components performing the same or similar function(s). Also, any additional components may be used with the circuit 200 to support other desired functions. Although FIG. 3 illustrates one example of a timing diagram 300 associated with operation of the digital pixel architecture shown in FIG. 2, various changes may be made to FIG. 3. For instance, the specific signals shown in FIG. 3 are merely meant to illustrate how some embodiments of the digital pixel architecture shown in FIG. 2 may operate. Modifications to the digital pixel architecture shown in FIG. 2 may result in changes to one or more of the signals in the timing diagram 300 of FIG. 3.

Figure 4:
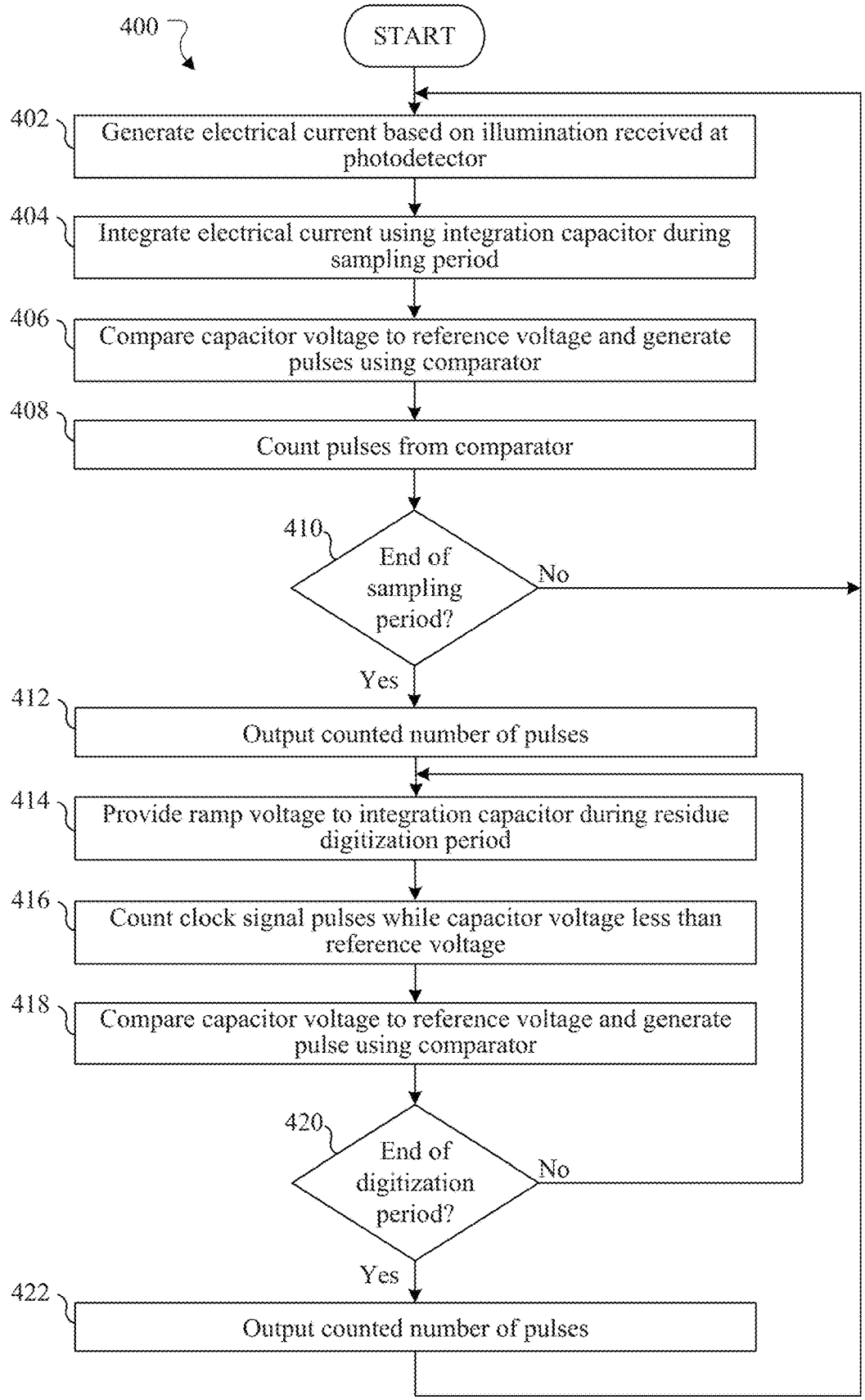
FIG. 4 illustrates an example method for using a digital pixel architecture supporting the re-use of components for in-pixel analog-to-digital conversion of an integration residue according to this disclosure.

FIG. 4 illustrates an example method 400 for using a digital pixel architecture supporting the re-use of components for in-pixel analog-to-digital conversion of an integration residue according to this disclosure. For ease of explanation, the method 400 is described as being performed using the circuit 200 of FIG. 2 in the system 100 of FIG. 1. However, the method 400 may be performed using any other suitable circuit and in any other suitable system.

As shown in FIG. 4, an electrical current is generated based on illumination received at a photodetector at step 402. This may include, for example, the photodetector 202 generating an electrical current based on received illumination. An integration capacitor is used to integrate the electrical current during a sampling period at step 404. This may include, for example, the integration capacitor 206 receiving the electrical current from the photodetector 202 and storing electrical energy based on the electrical current. The voltage of the integration capacitor is compared to a reference voltage in order to generate pulses during integration of the electrical current using a comparator at step 406. This may include, for example, the comparator 208 comparing the voltage of the integration capacitor 206 with the reference voltage $V_{Ref}$. This may also include the comparator 208 toggling its output when the voltage of the integration capacitor 206 equals or exceeds the reference voltage $V_{Ref}$, which can cause the integration capacitor 206 to reset and thereby cause the comparator 208 to toggle its output again (producing a pulse). Pulses from the comparator are counted during the sampling period at step 408. This may include, for example, the counter 212 counting the number of pulses contained in the digital output Comp from the comparator 208 during the sampling period. A determination is made whether the sampling period has ended at step 410. If not, the process can return to step 402 to continue generating and integrating the electrical current. Once the sampling period ends, the number of pulses counted by the counter can be output at step 412. This may include, for example, the counter 212 providing its count value over a column line 216.

At this point, a residue digitization time period may occur in order to digitize any residue remaining on the integration capacitor at the end of the sampling period. For example, a ramp voltage can be provided to the integration capacitor during the residue digitization time period at step 414. This may include, for example, controlling the switch 220 so that the ramp voltage $V_{Ramp}$ is provided to the integration capacitor 206 rather than the reset voltage $V_{Reset}$, which can charge the integration capacitor 206. While the capacitor voltage is less than the reference voltage, the counter is used to count clock pulses at step 416. This may include, for example, the counter 212 counting clock pulses provided to the counter 212 via the switch 218. The voltage of the integration capacitor is compared to the reference voltage using the comparator and an additional pulse is generated at step 418. This may include, for example, the comparator 208 comparing the voltage of the integration capacitor 206 with the reference voltage $V_{Ref}$. As long as the additional pulse is not generated, the counter 212 can continue counting clock pulses. Once the additional pulse is generated, the counter 212 can stop counting clock pulses. A determination is made whether the residue digitization time period has ended at step 420. If so, the number of pulses counted by the counter can be output at step 422. This may include, for example, the counter 212 providing its count value over a column line 216. This second count value can be processed in order to estimate the residual voltage that was on the integration capacitor 206 at the end of the sampling period.

In this way, the comparator 208 and the counter 212 can be used to generate a first count value during a sampling period, where the first count value is indicative of the number of times that the integration capacitor 206 is charged to the level of the reference voltage $V_{Ref}$ during the sampling period. The number of times that the integration capacitor 206 is charged to the level of the reference voltage $V_{Ref}$ is dependent on the amount of illumination received by the photodetector 202, such as when the integration capacitor 206 charges faster and is reset more often when there is more illumination being received. Thus, the first count value can be used to generate various bits of an image data value, such as most significant bits of the image data value. At the end of the sampling period, a residue may remain on the integration capacitor 206. The comparator 208 and the counter 212 can be used to generate a second count value during a residue digitization time period, where the second count value is indicative of the number of clock pulses received during charging of the integration capacitor 206 using the ramp voltage $V_{Ramp}$. Fewer clock pulses being counted is indicative of a larger residue, while more clock pulses being counted is indicative of a smaller residue. Suitable processing of the second count value can be used to estimate the residue on the integration capacitor 206, which can be converted into additional bits of the image data value, such as least significant bits of the image data value. After step 422, the process may be repeated to generate additional image data (such as for another image), or the process may end. Note that the image data captured using the method 400 may be used in any suitable manner, such as to generate images for display or other use. Also note that the method 400 shown here may be performed for each pixel circuit element of a focal plane array 104 or other device, and each pixel circuit element may operate independently.

Although FIG. 4 illustrates one example of a method 400 for using a digital pixel architecture supporting the re-use of components for in-pixel analog-to-digital conversion of an integration residue, various changes may be made to FIG. 4. For example, while shown as a series of steps, various steps in FIG. 4 may overlap, occur in parallel, occur in a different order, or occur any number of times (including zero times). Also, various additional functions may occur within each pixel circuit element or across multiple pixel circuit elements. For instance, deselect logic may be implemented to selectively deactivate certain pixel circuit elements, such as when faulty pixel circuit elements are deactivated to avoid their use when generating images or otherwise collecting image data.

The following describes example embodiments of this disclosure that implement or relate to a digital pixel architecture supporting the re-use of components for in-pixel analog-to-digital conversion of an integration residue. However, other embodiments may be used in accordance with the teachings of this disclosure.

In a first embodiment, an apparatus includes a photodetector configured to generate an electrical current based on received illumination. The apparatus also includes an integration capacitor configured to be charged by the electrical current and generate a capacitor voltage and to be discharged. The apparatus further includes a comparator configured to generate pulses in a digital output based on the capacitor voltage of the integration capacitor. In addition, the apparatus includes a counter configured to (i) in a first configuration, count the pulses in the digital output of the comparator during a sampling period and (ii) in a second configuration, count pulses in a clock signal during a residue digitization period. A counted number of pulses in the clock signal is indicative of a residue stored on the integration capacitor at an end of the sampling period. In a first embodiment, an apparatus includes a photodetector configured to generate an electrical current based on received illumination. The apparatus also includes an integration capacitor configured to be charged by the electrical current and generate a capacitor voltage and to be discharged. The apparatus further includes a comparator configured to generate pulses in a digital output based on the capacitor voltage of the integration capacitor. In addition, the apparatus includes a counter configured to (i) in a first configuration, count the pulses in the digital output of the comparator during a sampling period and (ii) in a second configuration, count pulses in a clock signal during a residue digitization period. A counted number of pulses in the clock signal is indicative of a residue stored on the integration capacitor at an end of the sampling period.

Any single one or any suitable combination of the following features may be used with the first embodiment. A switch may be configured to provide a reset voltage to the integration capacitor during the sampling period and to provide a ramp voltage to the integration capacitor during the residue digitization period, and the integration capacitor may be configured to be charged by the ramp voltage during the residue digitization period. A switch may be configured to provide the digital output of the comparator to a first input of the counter during the sampling period and to provide the digital output of the comparator to a second input of the counter during the residue digitization period, the counter may be configured to count the pulses in the digital output of the comparator received at the first input, and the counter may be configured to latch the counted number of the pulses in the clock signal in response to a pulse received at the second input. A switch may be configured to selectively provide the clock signal to the counter. A switch may be coupled in parallel with the integration capacitor, and the integration capacitor may be configured to be discharged when the switch is closed. In the second configuration, the integration capacitor, the comparator, and the counter may be collectively configured to operate as a single-slope analog-to-digital converter that digitizes the residue stored on the integration capacitor at an end of the sampling period. The counter may be coupled to a column line, the counter in the first configuration may be configured to output a first count value over the column line (the first count value indicative of a number of the pulses in the digital output of the comparator that are counted during the sampling period), and the counter in the second configuration may be configured to output a second count value over the column line (the second count value indicative of the counted number of the pulses in the clock signal that are counted during the residue digitization period).

In a second embodiment, a system includes a focal plane array having multiple pixel circuit elements. Each pixel circuit element includes a photodetector configured to generate an electrical current based on received illumination. Each pixel circuit element also includes an integration capacitor configured to be charged by the electrical current and generate a capacitor voltage and to be discharged. Each pixel circuit element further includes a comparator configured to generate pulses in a digital output based on the capacitor voltage of the integration capacitor. In addition, each pixel circuit element includes a counter configured to (i) in a first configuration, count the pulses in the digital output of the comparator during a sampling period and (ii) in a second configuration, count pulses in a clock signal during a residue digitization period. A counted number of pulses in the clock signal is indicative of a residue stored on the integration capacitor at an end of the sampling period.

Any single one or any suitable combination of the following features may be used with the second embodiment. In each pixel circuit element, a switch may be configured to provide a reset voltage to the integration capacitor during the sampling period and to provide a ramp voltage to the integration capacitor during the residue digitization period, and the integration capacitor may be configured to be charged by the ramp voltage during the residue digitization period. In each pixel circuit element, a switch may be configured to provide the digital output of the comparator to a first input of the counter during the sampling period and to provide the digital output of the comparator to a second input of the counter during the residue digitization period, the counter may be configured to count the pulses in the digital output of the comparator received at the first input, and the counter may be configured to latch the counted number of the pulses in the clock signal in response to a pulse received at the second input. In each pixel circuit element, a switch may be configured to selectively provide the clock signal to the counter. In each pixel circuit element, a switch may be coupled in parallel with the integration capacitor, and the integration capacitor may be configured to be discharged when the switch is closed. In the second configuration of each pixel circuit element, the integration capacitor, the comparator, and the counter of the pixel circuit element may be collectively configured to operate as a single-slope analog-to-digital converter that digitizes the residue stored on the integration capacitor at an end of the sampling period. In each pixel circuit element, the counter may be coupled to a column line, the counter in the first configuration may be configured to output a first count value over the column line (the first count value indicative of a number of the pulses in the digital output of the comparator that are counted during the sampling period), and the counter in the second configuration may be configured to output a second count value over the column line (the second count value indicative of the counted number of the pulses in the clock signal that are counted during the residue digitization period). All pixel circuit elements may be configured to operate in the second configuration in parallel.

In a third embodiment, a method includes generating an electrical current based on received illumination. The method also includes charging an integration capacitor using the electrical current to generate a capacitor voltage and discharging the integration capacitor. The method further includes generating pulses in a digital output of a comparator based on the capacitor voltage of the integration capacitor. The method also includes using a counter in a first configuration to count the pulses in the digital output of the comparator during a sampling period. In addition, the method includes using the counter in a second configuration to count pulses in a clock signal during a residue digitization period. A counted number of pulses in the clock signal is indicative of a residue stored on the integration capacitor at an end of the sampling period.

Any single one or any suitable combination of the following features may be used with the third embodiment. The method may also include using a switch to provide a reset voltage to the integration capacitor during the sampling period and to provide a ramp voltage to the integration capacitor during the residue digitization period, and the integration capacitor may be charged by the ramp voltage during the residue digitization period. The method may also include using a switch to provide the digital output of the comparator to a first input of the counter during the sampling period and to provide the digital output of the comparator to a second input of the counter during the residue digitization period, the counter may count the pulses in the digital output of the comparator received at the first input, and the counter may latch the counted number of the pulses in the clock signal in response to a pulse received at the second input. In the second configuration, the integration capacitor, the comparator, and the counter may collectively operate as a single-slope analog-to-digital converter that digitizes the residue stored on the integration capacitor at an end of the sampling period. The counter may be coupled to a column line, the counter in the first configuration may output a first count value over the column line (the first count value indicative of a number of the pulses in the digital output of the comparator that are counted during the sampling period), and the counter in the second configuration may output a second count value over the column line (the second count value indicative of the counted number of the pulses in the clock signal that are counted during the residue digitization period).

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   a photodetector configured to generate an electrical current based on received illumination;
   an integration capacitor configured to be charged by the electrical current and generate a capacitor voltage and to be discharged;
   a comparator configured to generate pulses in a digital output based on the capacitor voltage of the integration capacitor; and
   a counter configured to:
      in a first configuration, count the pulses in the digital output of the comparator during a sampling period; and
      in a second configuration, count pulses in a clock signal during a residue digitization period, a counted number of pulses in the clock signal indicative of a residue stored on the integration capacitor at an end of the sampling period.

2. The apparatus of claim 1, further comprising:
   a switch configured to provide a reset voltage to the integration capacitor during the sampling period and to provide a ramp voltage to the integration capacitor during the residue digitization period;
   wherein the integration capacitor is configured to be charged by the ramp voltage during the residue digitization period.

3. The apparatus of claim 1, further comprising:
   a switch configured to provide the digital output of the comparator to a first input of the counter during the sampling period and to provide the digital output of the comparator to a second input of the counter during the residue digitization period;
   wherein the counter is configured to count the pulses in the digital output of the comparator received at the first input; and
   wherein the counter is configured to latch the counted number of the pulses in the clock signal in response to a pulse received at the second input.

4. The apparatus of claim 1, further comprising:
   a switch configured to selectively provide the clock signal to the counter.

5. The apparatus of claim 1, further comprising:
   a switch coupled in parallel with the integration capacitor;
   wherein the integration capacitor is configured to be discharged when the switch is closed.

6. The apparatus of claim 1, wherein, in the second configuration, the integration capacitor, the comparator, and the counter are collectively configured to operate as a single-slope analog-to-digital converter that digitizes the residue stored on the integration capacitor at the end of the sampling period.

7. The apparatus of claim 1, wherein:
   the counter is coupled to a column line;
   in the first configuration, the counter is configured to output a first count value over the column line, the first count value indicative of a number of the pulses in the digital output of the comparator that are counted during the sampling period; and
   in the second configuration, the counter is configured to output a second count value over the column line, the second count value indicative of the counted number of the pulses in the clock signal that are counted during the residue digitization period.

8. A system comprising:
   a focal plane array comprising multiple pixel circuit elements;
   wherein each pixel circuit element comprises:
      a photodetector configured to generate an electrical current based on received illumination;
      an integration capacitor configured to be charged by the electrical current and generate a capacitor voltage and to be discharged;
      a comparator configured to generate pulses in a digital output based on the capacitor voltage of the integration capacitor; and
      a counter configured to:
         in a first configuration, count the pulses in the digital output of the comparator during a sampling period; and
         in a second configuration, count pulses in a clock signal during a residue digitization period, a counted number of pulses in the clock signal indicative of a residue stored on the integration capacitor at an end of the sampling period.

9. The system of claim 8, wherein, in each pixel circuit element:
   a switch is configured to provide a reset voltage to the integration capacitor during the sampling period and to provide a ramp voltage to the integration capacitor during the residue digitization period; and
   the integration capacitor is configured to be charged by the ramp voltage during the residue digitization period.

10. The system of claim 8, wherein, in each pixel circuit element:
    a switch is configured to provide the digital output of the comparator to a first input of the counter during the sampling period and to provide the digital output of the comparator to a second input of the counter during the residue digitization period;
    the counter is configured to count the pulses in the digital output of the comparator received at the first input; and
    the counter is configured to latch the counted number of the pulses in the clock signal in response to a pulse received at the second input.

11. The system of claim 8, wherein, in each pixel circuit element, a switch is configured to selectively provide the clock signal to the counter.

12. The system of claim 8, wherein, in each pixel circuit element:
a switch coupled in parallel with the integration capacitor; and
the integration capacitor is configured to be discharged when the switch is closed.

13. The system of claim 8, wherein, in the second configuration of each pixel circuit element, the integration capacitor, the comparator, and the counter of the pixel circuit element are collectively configured to operate as a single-slope analog-to-digital converter that digitizes the residue stored on the integration capacitor at the end of the sampling period.

14. The system of claim 8, wherein, in each pixel circuit element:
the counter is coupled to a column line;
in the first configuration, the counter is configured to output a first count value over the column line, the first count value indicative of a number of the pulses in the digital output of the comparator that are counted during the sampling period; and
in the second configuration, the counter is configured to output a second count value over the column line, the second count value indicative of the counted number of the pulses in the clock signal that are counted during the residue digitization period.

15. The system of claim 8, wherein all pixel circuit elements are configured to operate in the second configuration in parallel.

16. A method comprising:
generating an electrical current based on received illumination;
charging an integration capacitor using the electrical current to generate a capacitor voltage and discharging the integration capacitor;
generating pulses in a digital output of a comparator based on the capacitor voltage of the integration capacitor,
using a counter in a first configuration to count the pulses in the digital output of the comparator during a sampling period; and
using the counter in a second configuration to count pulses in a clock signal during a residue digitization period, a counted number of pulses in the clock signal indicative of a residue stored on the integration capacitor at an end of the sampling period.

17. The method of claim 16, further comprising:
using a switch to provide a reset voltage to the integration capacitor during the sampling period and to provide a ramp voltage to the integration capacitor during the residue digitization period;
wherein the integration capacitor is charged by the ramp voltage during the residue digitization period.

18. The method of claim 16, further comprising:
using a switch to provide the digital output of the comparator to a first input of the counter during the sampling period and to provide the digital output of the comparator to a second input of the counter during the residue digitization period;
wherein the counter counts the pulses in the digital output of the comparator received at the first input; and
wherein the counter latches the counted number of the pulses in the clock signal in response to a pulse received at the second input.

19. The method of claim 16, wherein, in the second configuration, the integration capacitor, the comparator, and the counter collectively operate as a single-slope analog-to-digital converter that digitizes the residue stored on the integration capacitor at the end of the sampling period.

20. The method of claim 16, wherein:
the counter is coupled to a column line;
in the first configuration, the counter outputs a first count value over the column line, the first count value indicative of a number of the pulses in the digital output of the comparator that are counted during the sampling period; and
in the second configuration, the counter outputs a second count value over the column line, the second count value indicative of the counted number of the pulses in the clock signal that are counted during the residue digitization period.

* * * * *